United States Patent Office 3,458,627
Patented July 29, 1969

3,458,627
COMPOSITIONS FOR PRESERVING GATHERED FRUIT SUCH AS CITRUS AND BANANAS AND METHOD FOR PREPARING THE SAME
Jacques Daudin, Le Robert, Martinique, France, and Raymond Hayot, Fort-de-France, Martinique, France
No Drawing. Filed Feb. 8, 1966, Ser. No. 525,863
Claims priority, application France, Feb. 18, 1965, 6,069
Int. Cl. A23b 7/14
U.S. Cl. 424—170                                    13 Claims

ABSTRACT OF THE DISCLOSURE

Composition for preserving gathered fruits and vegetables containing a fungicide, at least one liquid paraffinic hydorcarbon, a non-ionic emulsifying agent and an amino or alkaline salt of 2,4 dichlorophenoxyacetic acid, alpha naphthyl acetic acid, 2,4,5 trichlorophenoxyacetic acid and giberellic acid.

---

This invention relates to a new composition intended for the treatment of fruits and vegetables with inedible skins, particularly citrus fruits and bananas. This invention also relates to the method of preparation of the composition in question.

The composition in accordance with the invention is essentially noteworthy for the particularly valuable results which makes it possible to obtain during the transport and storage of fruits and vegetables with inedible skins with the object of improving their appearance, quality and keeping. Furthermore the composition in question can be used without any danger to the consumer.

It is well known that the problem of wastage, particularly wastage due to fungoid diseases (anthracnose, stem end rot, botrydiplodia etc.) during the transport and storage of bananas, is extremely serious economically. There must also be added to such fungoid damage the losses due to various forms of deterioration of the product known as "blotching," "speckle," "rust" or "pitting."

It is also well known that the losses generally experienced in the banana trade are not growing less, but tend to get worse because the various pathogenic agents have become immunised to the technological conditions of transport and ripening which have hardly varied since 1930. Furthermore intensification of cultivation and the widespread use of hydrocarbons has eventually resulted in an increased proportion of the fruit produced being less resistant to damage.

To all these extremely disadvantageous circumstances which may affect exotic fruits such as bananas, must be further added the dehydration of fruit during transport.

Thus for the banana industry the total annual wastage has been found to be about 5% by weight for the world average over these last few years and 8% for the French West Indies, taking into consideration the most unfavourable local conditions.

It has already been sought to remedy the disadvantages mentioned above by treating locally blemishes found on the central stems of bunches of bananas. But although these localized treatments enable some problems to be partially solved (particularly the problem of stem end rot), they leave unaffected the effects of dehydration, physiological problems such as skin spots or blackness and some pathological problems such as anthracnose.

Attempts have likewise been made to avoid these drawbacks by a complete treatment of bunches consisting of immersing them in a solution containing salicyl anilide as a fungicide to fight attacks of Nigrospora spherica.

Another dip liquid has been proposed consisting of a microcrystalline wax base emulsion. However, none of these treatments have more than a limited effect on the abovementioned disadvantages and, at any rate as regards the first of them, it has not been shown definitely that they are harmless to the consumer.

The object of this invention is to overcome all the abovementioned drawbacks.

The composition in accordance with this invention is characterized in that it consists of a fungicide in association with a physiologically active composition comprising the followng agents:

(a) At least one paraffinic liquid hydrocarbon having 23 to 26 carbon atoms.

(b) A non-ionic emulsifying agent soluble in hydrocarbons and in water.

(c) An amino salt or alkaline salt of one of the following organic acids: 2,4 dichlorophenoxyacetic acid, alpha naphthyl acetic acid, 2,4,5 trichlorophenoxyacetic acid, and giberellic acid.

The composition obtained by the combination of the above constituents will be termed in what follows "the basic composition." The basic composition is diluted for use in a large quantity of water to form the dip solution, ready for use.

In a preferred mode of embodiment of the invention the fungicide is selected from the group consisting of ethylene bis dithiocarbamate of zinc and ethylene bis dithiocarbamate of manganese. Of course it is also possible to ues a mixture of these two salts.

The quantity of active fungicide product in the basic composition in accordance with the invention may vary within wide limits. It is generally comprised between 5 and 15% by weight of the said composition, preferably between 9.5 and 10%.

For the preparation of the basic composition the fungicide is mixed in water in the proportion of 1 litre to 1.7 litres per kilo of the said composition.

The paraffinic hydrocarbon used in the composition of the physiologically active composition is preferably so selected as to have 24 or 25 carbon atoms.

In a particularly advantageous embodiment this hydrocarbon, or mixture of hydrocarbons, has the following characteristics:

| | |
|---|---|
| Density at 15.6° C. | *0.89 to 0.87 |
| Cleveland open cup flash point ° C. | 149 to 204 |
| A.S.T.M. colour | 1 |
| Setting point ° C. | —40 to —1.2 |
| S.U.S. viscosity (Saybolt) at 38° C. | 65 to 105 |
| Distillation, ° C. (I.B.P.) | 121 to 371 |
| Neutralization value | 0.01 to 0.02 |
| Ash, percent | 0.0001 |
| Aromatics, percent | 15 to 25 |
| Unsulphonated residue, percent | 80 to 95 |

*A.P.I. density=28 to 31.5.

The quantity of hydrocarbon used is advantageously comprised between 60 and 80% by volume of the final mixture in relation to the basic composition, and preferably 70%.

The non-ionic emulsifying agent is preferably selected from the group of aryl-alkyl polyether alcohols, preferably in a proportion of 5 to 15% by volume in relation to the hydrocarbon used. This proportion is in accordance with the preferred condition of the present invention, according to which the basic composition is used as a stable viscous paste.

The proportion of amino salt or alkaline salt of the 2,4 dichlorophenoxyacetic, or alpha naphthyl acetic, or trichlorophenoxyacetic acids, or of giberellic acid, generally lies between 3 and 5 ml. of active product per litre of hydrocarbon and is preferably 3.8 ml.

In a preferred mode of embodiment of the invention the physiologically active composition obtained by incorporation of the three types of ingredient preferably presents, after homogenization, the following characteristic features:

| | |
|---|---:|
| A.P.I. density | 28.50 to 29 |
| C.O.C. flash point in ° C. | 188 to 193 |
| A.S.T.M. colour | 1.25 |
| Setting point ° C. | −9.5 to −8.9 |
| S.U.S. viscosity at 38° C. | 103 to 109 |
| Distillation ° C. (I.B.P.) | 330 to 340 |
| Unsulphonated residues, percent | 93 to 97 |
| Refraction indices | 1.478 to 1.482 |
| Aromatics, percent | 3.0 to 6.0 |
| Ash | 0.0001 |
| Neutralization value | 0.065 to 0.075 |

The respective proportions of the two constituents of the composition are 1 litre of fungicide to 1.7–5.5 litres of physiological composition, the preferred proportion being about 1 to 3.4.

The following figures are given by way of nonrestrictive numerical examples, enabling quantities of basic composition very close to 100 litres to be obtained:

| Designation of compositions | 1 | 2 | 3 | 4 | 5 | 6 | 7 |
|---|---|---|---|---|---|---|---|
| 1. Fungicide: | | | | | | | |
| Technical fungicide agent, 80% active matter (kg.) | 6.25 | 6.25 | 18.75 | 18.75 | 18.75 | 18.75 | 12.20 |
| Water (in litres) | 11.25 | 11.10 | 15.50 | 21.50 | 15.35 | 21.35 | 13.05 |
| Volume of fungicide in litres | 15.75 | 15.60 | 30.80 | 36.80 | 30.65 | 36.65 | 22.75 |
| 2. Physiological composition: | | | | | | | |
| Hydrocarbon (in litres) | 80.00 | 80.00 | 60.00 | 60.00 | 60.00 | 60.00 | 70.00 |
| Non-ionic emulsifier (in litres) | 4.00 | 4.00 | 9.00 | 3.00 | 9.00 | 3.00 | 7.00 |
| Alpha-naphthyl acetic acid, 100% active matter (in litres) | 0.24 | 0.40 | 0.18 | 0.18 | 0.30 | 0.30 | 0.26 |
| Volume in litres of physiological composition | 84.24 | 84.40 | 69.18 | 63.18 | 69.30 | 63.30 | 77.25 |

As a further example there may further be mentioned:

(1) Fungicide:

| | Kg. |
|---|---:|
| Ethylene bis-dithiocarbamate of zinc (technical salt, 80% active matter) | 11.5 |
| Water | 11.6 | with a corresponding total volume of 22.6 litres.

(2) Physiological composition:

| | Litres |
|---|---:|
| Hydrocarbon having the characteristics indicated above | 70 |
| 2,4-dichlorophenoxyacetic acid | 0.4 |
| Emulsifier (derivative of sorbitol) | 7 |
| Volume of physiological composition | 77.4 | or a total volume of 100 litres for the basic composition.

The concentrated basic composition is used for the treatment of fruits and vegetables, particularly citrus fruits and bananas, in the form of a mixture diluted in water. Its concentration in the composition ready for use may vary within wide limits. In a preferred embodiment it is of the order of 3%.

The invention also relates to a method of preparation of the abovementioned composition, characterized in that the hydrocarbon meeting the condition defined is mixed, preferably hot at a temperature between 40 and 90° C., with the non-ionic emulsifying agent, the mixture is vigorously stirred to homogenize it, there is then added to the resultant mixture a salt chosen from the amino salts and alkaline salts of the 2,4-dichlorophenoxyacetic acids, alpha naphthyl acetic acids, trichlorophenoxyacetic acids and giberellic acids, and finally there is added to the mixture thus obtained the fungicide, preferably in an aqueous solution.

In a preferred mode of application of the method of the invention the homogenization is effected after a first vigorous mixing for about ¼ of an hour by treatment between 100 and 400 kg. per sq. cm. in an homogenizing machine of the Gaulin type for instance, which develops pressures of the order of 100 to 400 kg. per sq. cm. There is then added one of the abovementioned salts cold, distributing it uniformly in the mass. Finally the fungicide is gently added, continuously stirring, to the mixture obtained.

The final product consists of a stable viscous paste, easily stored and transported, forming the basic composition.

In use this composition is diluted in about 32 times its weight of water.

The method of use, in a preferred mode of application of the invention, is as follows:

The composition, ready for use, is poured into a container intended for dipping the fruits, preferably insulated by a protective coat of paint or varnish.

The treatment of the fruits or vegetables in question, particularly bunches or "hands" of bananas, is advantageously effected on the spot where the crop is harvested.

This treatment essentially consists of a complete immersion in the dip liquid.

To render the treatment homogeneous the bunch of bananas for instance is kept in motion during the dipping and in this way a cleansing effect is obtained while simultaneously a stirring is going on.

Experience shows that an average bunch of 15 kg. carries off about ⅓ of a litre of the mixture after being allowed to drip, which corresponds to the quantity of the product retained on the surface.

The applicants have carried out numerous tests with the composition of the invention. In particular, tests have been carried out on lots of bananas whose total weight varied between 200 and 500 kg., corresponding to a number of bunches between 10 and 40, or say 10 to 25 boxes. In the case of the bunches treated each hand carried a control, in the sense that the treatment was carried out longitudinally in such a way as only to affect half the bunch, for observations of blemishes, color or parasitic attacks.

In the case of hands of bananas transported in wood or cardboard boxes the experiments were carried out in accordance with the method of R. Coutand and C. Jean-Louis, pp. 5–7 of the report entitled: "Resultats Préliminaires sur les Améliorations des Techniques de Traitement des Bananes Destinées à l'Exportation" ("Preliminary Results in Connection With Improvements in Techniques of Treatment of Bananas for Export") (Ministry of Agriculture). In accordance with these arrangements the hands of bananas are divided into two parts arranged on either side of a cardboard partition, each part being given a separate treatment.

After the fruit is treated it is subjected for 12 hours to a tropical temperature of 25°, then stored horizontally and cooled by ventilation to bring it in 24 hours to a pulp temperature of 11.5°, with an ambient humidity of 90–95 and a $CO_2$ rate below 2. These conditions are maintained for 10 to 12 days in order to reproduce actual conditions of transport by ship. The ambient conditions of the room are then changed and it is kept for 24 hours at a temperature of 20° C.

The fruit is then handled and brought into a condition of artificially fast ripening, as described in the "Banana Ripening Manual" of Messrs. United Fruit Co., pp. 28 and 29.

The above tests, carried out on a load of 9 metric tons of fruit, divided into 21 sets, led to the following conclusions, which were confirmed by subsequent experiments:

Before ripening

The treatment prolonged the preclimactic stage of the fruit.

It did not set up a reaction in depth in the skin of the fruit, thus excluding "rust."

The control fruits had 27.5% of anthracnose while the treated fruit had none.

A gain in weight of 0.80% in favour of the treated fruit was found, because their desiccation is less than that of the control fruit.

During ripening

The fruit treated behaved normally and reacted perfectly to the various ripening techniques.

The treatment has a marked effect on the carotenoid pigments and the fruit treated had a more sustained yellow colour than the control fruit.

The loss of weight due to desiccation during the ripening process was 1.55% for the treated fruit by contrast with 2% for the control, or a gain of 20%.

As the peduncles of the treated fruit developed less quickly than the peduncles of the control fruit, the treatment considerably reduced the effects of blotching in the ripening rooms.

After ripening

Treated fruit can remain on sale for more than three days longer than the control fruit.

The normal and generalized tendency of the control fruit to "blotching" at a certain stage of development (stage 7 on the scale of development of the United Fruit Company) does not exist in treated fruit issued from the ripening room on the same day.

"Spotting" or "specking" which detracts from the satisfactory commercial appearance of the fruit, is completely avoided on the treated fruit.

Results of the same kind were obtained with pineapples, cucumbers and citrus fruits.

Observations carried out under the microscope, particularly in the epicarpic tissues of bananas, led to the conclusion (thanks to specific colouration of the hydrocarbons) that the spread of the light parts of the composition did not exceed a third of the epicarpic zone. The complete harmlessness of the treatment and any of its possible residual effects on the consumer, is thus ensured.

This offers a possible explanation of the very surprising favourable results which have just been described, but of course the invention is not in any way bound by this explanation.

The composition produces a complete covering of the fruit by cleansing off the natural bloom, so that the surface tensions at the skin level are broken, while the fungicide covering is uniformly distributed.

At the same time an artificial bloom is produced which to some extent blocks out the phenomena of evaporation and respiration while permitting a certain amount of gaseous exchange and in particular the diffusion of the volatile ethers of valeric and butyric acids. These ethers in fact are responsible (because of their accumulation under certain conditions) for the production of the reddish brown tracks and spots commonly known as "rust" (in this case it is a matter of a physiological "rust" the causes of which are different from those causing the pathological "rust" due to thrips).

Furthermore the composition retards the initiation in the fruit of the enzymatic process (particularly the action of the enzymes which lead to the degradation of the cellulose, transforming it to pectins) and delays the initiation of the climactic phase, without interfering with the ripening process. On the other hand, because of the partial blockage both of the enzymatic process and of evaporation and transpiration, a synergetic effect is obtained which results in a physiological homogenization of the lots treated. Consequently these will respond better overall to a standardized homogeneous ripening.

The composition in accordance with the invention also holds back the initiation of the enzymatic process on the fibrous support tissues and consequently the phenomenon of physiological blotching of normally ripened fruit, in consumer markets.

An increase has also been found in the intensity of the yellow colouration of the ripe fruit. The fruit treated has in fact a more sustained yellow colour than the control fruits. Now, there is a correlation between the more sustained colour of the fruit and a higher percentage of the total of invert sugars.

Finally, it appears that the alkaline or amino salts of the 2,4-dichlorophenoxyacetic acids, alpha naphthyl acetic acids and others provided act as activating agents in the phenomena of ripening. This action is dampened by the action of the hydrocarbons which is, on the contrary, inhibitive. It is also possible that these agents play a favourable part in the osmotic equilibrium existing between the skin and the pulp of the fruit.

We claim:

1. A composition for preserving gathered fruits and vegetables with inedible skins, particularly citrus fruits and bananas, comprising a fungicide associated with a physiologically active composition comprising the following agents:

(a) at least one paraffinc liquid hydrocarbon having 23 to 26 carbon atoms and having substantially the following properties:

| | |
|---|---|
| Density at 15.6° C. | *0.89 to 0.87 |
| Cleveland open cup flash point in ° C. | 149 to 204 |
| A.S.T.M. colour | 1 |
| Setting point, ° C. | −40 to −1.2 |
| S.U.S. viscosity (Saybolt) at 38° C. | 65 to 105 |
| Distillation, ° C. (I.B.P.) | 121 to 371 |
| Neutralization number | 0.01 to 0.02 |
| Ash, percent | 0.0001 |
| Aromatics, percent | 15 to 25 |
| Unsulphonated, residue percent | 80 to 95 |

* A.P.I. density 28 to 31.5.

(b) a non-ionic emulsifying agent soluble in hydrocarbons and in water,
  (c) a salt selected from the group consisting of amino and alkaline salts of an acid selected from the group consisting of 2,4-dichlorophenoxyacetic acid, alpha naphthyl acetic acid, 2,4,5 - trichlorophenoxyacetic acid and giberellic acid.

2. Composition according to claim 1 wherein said fungicide is selected from the group consisting of ethylene-bis-dithiocarbamate of zinc, ethylene-bis-dithiocarbamate of manganese and mixtures thereof.

3. Composition according to claim 1 wherein the quantity of active fungicide product is between 5 and 15% of the concentrated composition, and preferably between 9.5 and 10%.

4. Composition according to claim 1 wherein the paraffinic hydrocarbon used for the physiologically active complex has 24 to 25 carbon atoms.

5. Composition according to claim 1 wherein the quantity of hydrocarbon represents by volume 60 to 80% of that of the said composition.

6. Composition according to claim 1 wherein the non-ionic emulsifying agent is preferably selected from the group of polyether-aryl-alkyl alcohols.

7. Composition according to claim 1 wherein the concentration of the emulsifying agent is 5 to 15% by volume relatively to the volume of hydrocarbon used.

8. Composition according to claim 1 wherein the proportion of the abovementioned salts of the acids mentioned in subsection (c) lies substantially between 3 and 5 ml. of active product per litre of hydrocarbon and is preferably 3.8 per litre.

9. Composition according to claim 1 and comprising from 1.7 to 5.5 litres of physiological composition per litre of fungicide in the basic composition, the preferred proportion being 3.4.

10. Composition according to claim 1 and comprising in addition dilution water in such an amount that the concentration of the ingredients of said composition in said water is about 3%.

11. Composition according to claim 1 wherein said physiological composition, when homogenised has substantially the following characteristic features:

| | |
|---|---|
| A.P.I. density | 28.50 to 29 |
| Cleveland open cup flash point, ° C. | 188 to 193 |
| A.S.T.M. | 1.25 |
| Setting point, ° C. | −9.5 to −8.9 |
| S.U.S. viscosity at 38° C. | 103 to 109 |
| I.B.P. distillation, ° C. | 330 to 340 |

12. A method for preparing a composition for preserving gathered fruits and vegetables with inedible skins, particularly citrus fruits and bananas, comprising a fungicide associated with a physiologically active composition comprising the following agents:

(a) at least one paraffinic liquid hydrocarbon having 23 to 26 carbon atoms and having substantially the following properties:

| | |
|---|---|
| Density at 15.6° C. | * 0.89 to 0.87 |
| Cleveland open cup flash point in ° C. | 149 to 204 |
| A.S.T.M. colour | 1 |
| Setting point, ° C. | −40 to −1.2 |
| S.U.S. viscosity (Saybolt) at 38° C. | 65 to 105 |
| Distillation, ° C. (I.B.P.) | 121 to 371 |
| Neutralization number | 0.01 to 0.02 |
| Ash, percent | 0.0001 |
| Aromatics, percent | 15 to 25 |
| Unsulphonated residue, percent | 80 to 95 |

*A.P.I. density 28 to 31.5°.

(b) a non-ionic emulsifying agent soluble in hydrocarbons and in water, (c) a salt selected from the group consisting of amino and alkaline salts of an acid selected from the group consisting of 2,4-dichlorophenoxyacetic acid, alpha naphthyl acetic acid, 2,4,5-trichlorophenoxyacetic acid, giberellic acid, said method comprising mixing said hydrocarbon preferably hot and at a temperature between 40 and 90° C. with said non-ionic emulsifying agent, vigorously stirring to homogenize the mixture, adding to the resulting mixture said salt, and finally the fungicide.

13. Method according to claim 12 wherein after a first vigorous stirring the homogenization is effected by treatment between 100 and 400 kg. per sq. cm. in an homogenizing machine, wherein there is then added one at least of said salts so as to distribute it uniformly in the mass and finally there is added gently and with continuous stirring said fungicide to the mass.

References Cited
UNITED STATES PATENTS

| | | | |
|---|---|---|---|
| 2,788,268 | 4/1957 | Tursich | 99—156 |
| 2,866,709 | 12/1958 | Gerwe et al. | 99—168 |
| 2,898,263 | 8/1959 | Nelson et al. | 167—43 |
| 3,037,867 | 6/1962 | Daudin et al. | 99—154 |

A. LOUIS MONACELL, Primary Examiner

J. M. HUNTER, Assistant Examiner

U.S. Cl. X.R.

424—286, 289, 287, 316, 317